US012627749B2

(12) United States Patent
Thubert et al.

(10) Patent No.: US 12,627,749 B2
(45) Date of Patent: May 12, 2026

(54) SYSTEMS AND METHODS FOR STATIC CONTEXT HEADER COMPRESSION INSTANTIATION

(71) Applicant: Cisco Technology, Inc., San Jose, CA (US)

(72) Inventors: Pascal Thubert, Roquefort les Pins (FR); Eric Levy-Abegnoli, Valbonne (FR); Patrick Wetterwald, Mouans Sartoux (FR); Jp Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 285 days.

(21) Appl. No.: 18/354,045

(22) Filed: Jul. 18, 2023

(65) Prior Publication Data

US 2025/0030783 A1 Jan. 23, 2025

(51) Int. Cl.
*H04L 69/04* (2022.01)
*H04L 69/22* (2022.01)

(52) U.S. Cl.
CPC .............. *H04L 69/04* (2013.01); *H04L 69/22* (2013.01)

(58) Field of Classification Search
CPC ................................ H04L 69/04; H04L 69/22
See application file for complete search history.

(56) References Cited

U.S. PATENT DOCUMENTS

| | | | |
|---|---|---|---|
| 2020/0022022 A1* | 1/2020 | Ly | H04L 69/04 |
| 2020/0137628 A1* | 4/2020 | Kandasamy | H04L 67/5651 |
| 2021/0058477 A1* | 2/2021 | Keränen | H03M 7/30 |
| 2021/0110292 A1* | 4/2021 | Minaburo | H04L 69/04 |

OTHER PUBLICATIONS

IPv6 Over Low-Power Wireless Personal Area Network (6LoWPAN) Routing Header, IETF RFC 8138 (Year: 2017).*
Abdelfadeel K.Q., et al., "Dynamic Context for Static Context Header Compression in LPWANs", Researchgate, Apr. 2018, 9 Pages.
Moons B., et al., "Using SCHC for an Optimized Protocol Stack in Multimodal LPWAN Solutions", IEEE 5th World Forum on Internet of Things (WF-IoT), Jul. 22, 2019, pp. 430-435.
Thubert P., et al., "IPv6 Over Low-Power Wireless Personal Area Network (6LoWPAN) Routing Header", Internet Engineering Task Force (IETF), Request for Comments: 8138, Apr. 2017, pp. 1-37.

* cited by examiner

*Primary Examiner* — Joseph G Ustaris
(74) *Attorney, Agent, or Firm* — Polsinelli P.C.

(57) ABSTRACT

Systems, methods and computer-readable storage media are provided for encoding, within the SRH-6LoRH field within a data packet, an IPv6 address that can be used to decompress the SCHC information in the data packet. A rule is generated that indicates that the first network address in the SRH-6LoRH field of the data packet is usable to decompress the SCHC information from the data packet as opposed to the compression residue. When the data packet is received at the destination node, the destination node, through a SCHC decompressor, uses the first network address in the SRH-6LoRH field according to the rule to decompress the SCHC information.

20 Claims, 6 Drawing Sheets

*300*

COMPRESS NETWORK ADDRESSES CORRESPONDING TO HOPS ALONG SOURCE ROUTE IN THE SRH-6LoRH  ~302

DEFINE NEW RULE INDICATING SCHC-COMPRESSED ADDRESS INCLUDED IN 6LoRH  ~304

ENCODE DATA PACKET INCLUDING NEW RULE IDENTIFIER AND COMPRESSED NETWORK ADDRESSES  ~306

TRANSMIT DATA PACKET ACCORDING TO SOURCE ROUTE  ~308

400

402
RECEIVE A DATA PACKET THAT ENCODES A SET OF ADDRESSES IN THE SRH-6LoRH

404
IS DATA PACKET AT LAST 6LoRH ENTRY?

NO

406
SNIP IPV6 ADDRESS FROM FIRST FIELD OF DATA PACKET

408
TRANSMIT DATA PACKET TO NEXT DESTINATION ON ROUTE

YES

410
USE DESTINATION IP ADDRESS IN SRH-6LoRH TO DECOMPRESS SCHC INFORMATION

SYSTEMS AND METHODS FOR STATIC CONTEXT HEADER COMPRESSION INSTANTIATION

TECHNICAL FIELD

The present disclosure generally relates to the field of computer networking, particularly with regard to the extension of statis context header compression (SCHC) to allow for rules to be instantiated dynamically during packet processing based on information found within a node network address and a 6LoRH.

BACKGROUND

SCHC is a stateful compression technique, primarily designed for Internet-of-Things (IoT) and other constrained devices, that recognizes regular expressions as bit patterns and compresses these regular expressions. Through SCHC, a regular expression is given as a matching rule and, based on the rule, an SCHC compressor can elide some bits and indicate that the rule was applied. However, the writing of SCHC rules for every device to hardcode local information, such as their Internet Protocol (IP) address, is impractical. Thus, there is a need to obtain rules from a more dynamically instantiated location.

BRIEF DESCRIPTION OF THE FIGURES

To provide a more complete understanding of the present disclosure and features and advantages thereof, reference is made to the following description, taken in conjunction with the accompanying drawings, in which.

DETAILED DESCRIPTION

Figure 1:
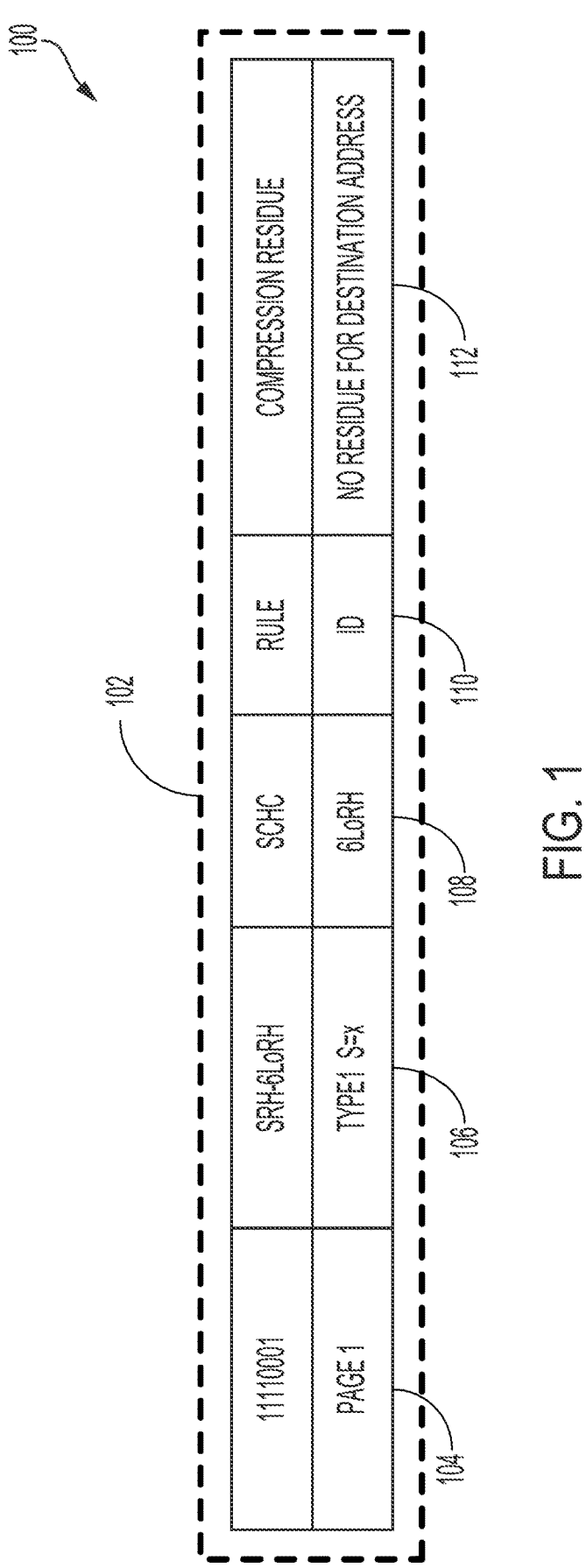
FIG. 1 shows an illustrative example of an environment in which a data packet is generated that indicates that the destination IP address specified in the source routing header-6LoRH (SRH-6LoRH) is usable to decompress SCHC information from the data packet in accordance with at least one embodiment.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Disclosed herein are systems, methods and computer-readable storage media for encoding, within the SRH-6LoRH field within a data packet, an IPv6 address that can be used to decompress the SCHC information in the data packet.

In an example, a computer-implemented method comprises generating a data packet. A first field of the data packet is usable to define a set of network addresses corresponding to different nodes along a network route. Further, the data packet includes a SCHC residue. The computer-implemented method further comprises encoding a first network address of the set of network addresses within the first field of the data packet. The first network address corresponds to a destination network address. Further, the destination network address is usable to decompress SCHC information encoded in the data packet. The computer-implemented method further comprises generating a rule. The rule indicates that the first network address within the first field is usable to decompress the SCHC information. Further, an identifier corresponding to the rule is encoded into the data packet. The computer-implemented method further comprises transmitting the data packet. When the data packet is received at a destination node along the network route, the destination node processes the rule identifier to decompress the SCHC information using the first network address according to the rule.

In an example, the set of network addresses includes one or more Internet Protocol version 6 (IPv6) addresses corresponding to the different nodes along the network route.

In an example, the first field is a Segment Routing Header-6LoWPAN Routing Header (SRH-6LoRH).

In an example, the rule is generated dynamically during processing of the data packet.

In an example, the set of network addresses includes one or more Media Access Control (MAC) addresses corresponding to the different nodes along the network route.

In an example, the data packet does not include other SCHC residue corresponding to the destination network address.

In an example, the set of network addresses are consumed as the data packet progresses through the different nodes such that, when the data packet is received at the destination node along the network route, the first field of the data packet includes only the first network address of the set of network addresses.

In an example, a system comprises one or more processors and memory storing thereon instructions that, as a result of being executed by the one or more processors, cause the system to generate a data packet. A first field of the data packet is usable to define a set of network addresses corresponding to different nodes along a network route. Further, the data packet includes a SCHC residue. The instructions further cause the system to encode a first network address of the set of network addresses within the first field of the data packet. The first network address corresponds to a destination network address. Further, the destination network address is usable to decompress SCHC information encoded in the data packet. The instructions further cause the system to generate a rule. The rule indicates that the first network address within the first field is usable to decompress the SCHC information. Further, an identifier corresponding to the rule is encoded into the data packet. The instructions further cause the system to transmit the data packet. When the data packet is received at a destination node along the network route, the destination node processes the rule identifier to decompress the SCHC information using the first network address according to the rule.

In an example, a non-transitory computer-readable storage medium stores thereon executable instructions that, as a result of being executed by one or more processors of a computer system, cause the computer system to generate a data packet. A first field of the data packet is usable to define a set of network addresses corresponding to different nodes along a network route. Further, the data packet includes a SCHC residue. The executable instructions further cause the computer system to encode a first network address of the set of network addresses within the first field of the data packet. The first network address corresponds to a destination network address. Further, the destination network address is usable to decompress SCHC information encoded in the data packet. The executable instructions further cause the computer system to generate a rule. The rule indicates that the first network address within the first field is usable to decompress the SCHC information. Further, an identifier corresponding to the rule is encoded into the data packet. The executable instructions further cause the computer system to transmit the data packet. When the data packet is received at a destination node along the network route, the destination node processes the rule identifier to decompress the SCHC information using the first network address according to the rule.

DESCRIPTION OF EXAMPLE EMBODIMENTS

Figure 5:
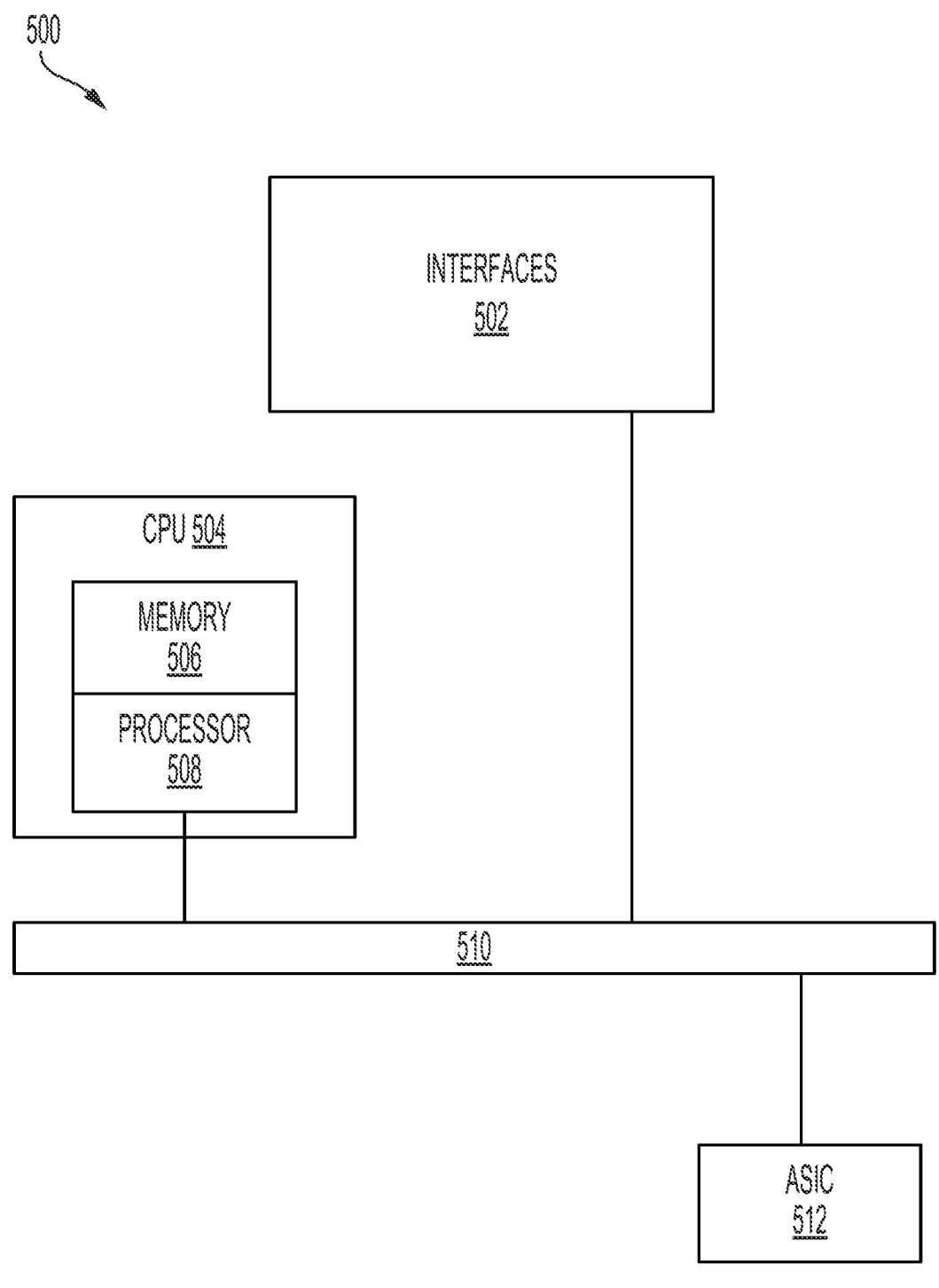
FIG. 5 illustrates an example network device suitable for performing switching, routing, and other networking operations in accordance with some embodiments.
Figure 6:
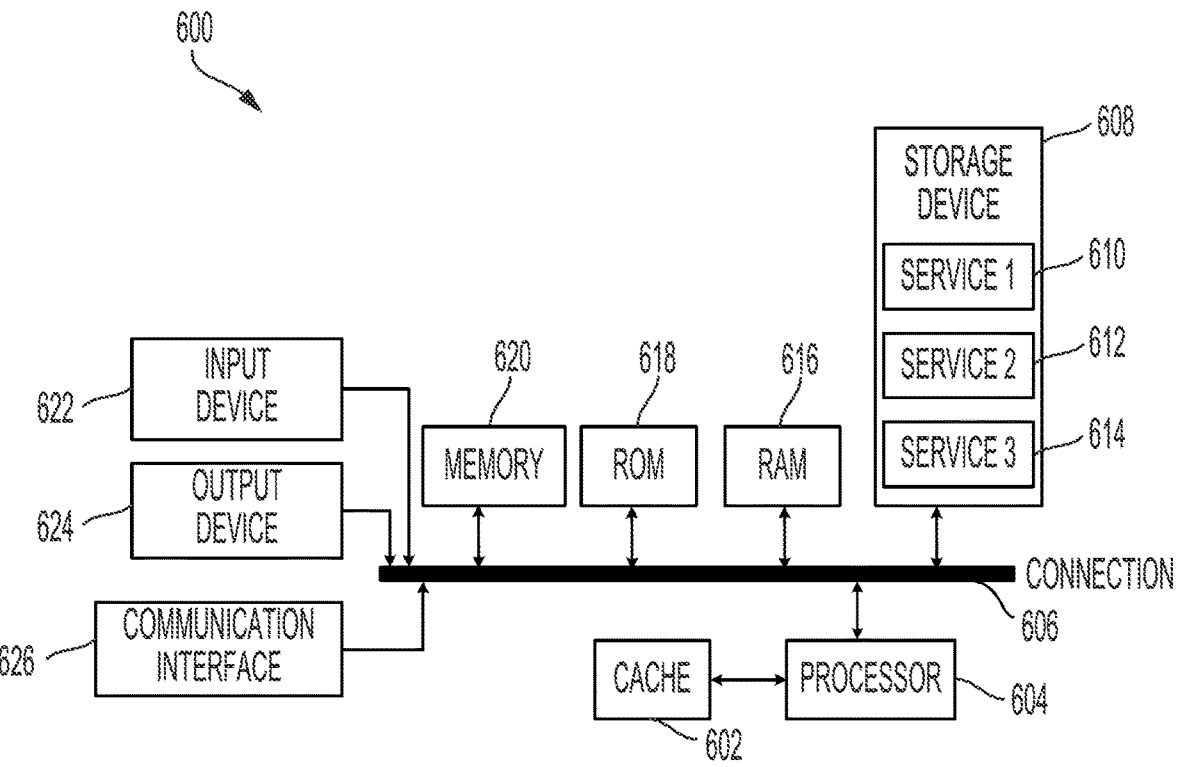
FIG. 6 illustrates a computing system architecture including various components in electrical communication with each other using a connection in accordance with some embodiments.

Disclosed herein are systems, methods and computer-readable storage media for encoding, within the SRH-6LoRH field within a data packet, an IPv6 address that can be used to decompress the SCHC information in the data packet. The present technologies will be described in more detail in the following disclosure as follows. The discussion begins with a detailed description of example systems, processes and environments for encoding an IPv6 address that can be used to decompress the SCHC information in the data packet, as illustrated in FIGS. 1 through 4. The discussion concludes with a description of an example network and computing devices, as illustrated in FIGS. 5 and 6.

FIG. 1 shows an illustrative example of an environment 100 in which a data packet 102 is generated that indicates that the destination IP address specified in the SRH-6LoRH is usable to decompress SCHC information from the data packet 102 in accordance with at least one embodiment. In the environment 100, a new data packet 102 is generated that may be transmitted to a destination node along a network route. The destination node and any other nodes along the network route may include IoT devices or other constrained devices within a low-power wide area network (LPWAN) or other network that interconnects these IoT devices or other constrained devices. The IoT devices or other constrained devices within the LPWAN or other network may have limited bandwidth with low bit rates, thereby limiting the size of the data packets that may be transmitted over the LPWAN or other network.

In an embodiment, a root node within the LPWAN or other network generates a data packet 102 that encodes network addresses corresponding to the myriad nodes (including the destination node) along a network route in a SRH. The first network address encoded in the SRH is defined as the destination network address corresponding to the destination node that is to receive and process the data packet 102. The other network addresses encoded in the SRH, thus, may correspond to the other intermediate network nodes, or hops, through which the data packet 102 is to be routed through in order to reach the destination node.

The data packet 102 may include a dispatch value 104 that indicates a binary value corresponding to a context switch in the 6LoWPAN parser. This context switch, as illustrated in FIG. 1, may correspond to Page 1. This Page 1 paging dispatch (given a binary value of "11110001," as illustrated in FIG. 1), provides a context switch mechanism for 6LoW- PAN compression that allows for the introduction of a 6LoWPAN Routing Header (6LoRH) that may be used to carry IPv6 routing information. The 6LoRH may include source routing information such as a compressed form of SRH and other sorts of routing information (e.g., Routing Protocol for Low-Power and Lossy Networks (RPL) Packet Information (RPI), IP-in-IP encapsulation, etc.). The 6LoRH may be expressed in the data packet 102 as a type-length-value (TLV) field.

In an embodiment, the data packet 102 further includes an SRH-6LoRH header 106 that includes a set of compressed network addresses corresponding to the different network nodes or hops according to the network route the data packet 102 is to traverse to reach a destination node. As illustrated in FIG. 1, the SRH-6LoRH header 106 is a Type 1 SRH-6LoRH header, whereby the network addresses that are compressed into the data packet 102 are derived from an Institute of Electrical and Electronic Engineers (IEEE) 802.15.4 short address and the corresponding network nodes share a personal area network (PAN) identifier. The SRH-6LoRH header 106 may further indicate the number of different network nodes or hops that the data packet 102 is to traverse, including the root and destination nodes. As an illustrative example, the SRH-6LoRH header 106 may indicate a size, S, of x. This may denote that the SRH-6LoRH indicates x+1 hops, including the root and destination nodes. The network address of the root node may be taken as reference and the last two octets of the network addresses of the intermediate hops are encoded.

The data packet 102 may further include an SCHC dispatch field 108, which may serve to indicate that the next fields in the data packet 102 include a SCHC header that comprises a rule identifier and a compression residue. In an embodiment, the SCHC dispatch field 108 is used to indicate that the data packet 102 is using the 6LoRH for the SCHC-compressed address. Accordingly, the root node may instantiate a rule according to the SCHC charter that provides for the use of the destination network address indicated in the SRH-6LoRH to decompress the SCHC information encoded in the data packet 102. This rule may be assigned a rule identifier, which is denoted in the rule identifier field 110 in the data packet 102. The rule identifier field 110 may be part of the SCHC header, as described above.

In an embodiment, the compression residue 112 within the data packet 102 and the SCHC header. The compression residue 112 may include the bits that could not be compressed in a dense concatenated form. These bits are encoded after the rule identifier field 110 of the data packet 102 and SCHC header, as illustrated in FIG. 1. In an embodiment, since the newly defined rule indicates that the SCHC-compressed address is found in the 6LoRH of the data packet 102, the compression residue 112 does not need to be used for decompression of SCHC information from the data packet 102. Instead, the destination IP address encoded in the SRH-6LoRH may be used to decompress the SCHC information from the data packet 102 according to this rule. This may reduce the amount of compression residue 112 that needs to be included in the data packet 102 and transported along the network route.

In an embodiment, once the data packet 102 has been generated, the root node may transmit the data packet 102 to the next hop as indicated in the SRH-6LoRH. The network addresses in the SRH-6LoRH may be provided in order such that the first address in the SRH-6LoRH corresponds to the destination node (e.g., the destination network address) with each subsequent address corresponding to the preceding network node or hop that is to be transited in order to reach the destination network node. In an embodiment, as the data packet 102 is transited through these intermediate network nodes, each corresponding network address in the SRH-6LoRH is consumed and removed from the data packet 102. Accordingly, when the data packet 102 arrives at the last SRH-6LoRH entry (e.g., the destination network address), the only network address remaining in the SRH-6LoRH is the destination network address of the destination network node.

When the data packet 102 arrives at the destination network node corresponding to the last SRH-6LoRH entry in the data packet 102, the destination network node may evaluate the rule corresponding to the rule identifier specified in the rule identifier field 110. As noted above, the rule identifier field 110 may indicate a rule identifier corresponding to a new rule generated by the root node. This new rule may indicate that the destination IP address encoded in the SRH-6LoRH may be used to decompress the SCHC information from the data packet 102. Accordingly, the destination network node may use the destination network address from the SRH-6LoRH to decompress the SCHC information from the data packet 102. As the destination network node does not need to rely on the compression residue 112 to decompress the encoded SCHC information, the compression residue 112 (as illustrated in FIG. 1) need not include any residue for the destination network address. This reduces the size of the compression residue 112, thereby decreasing the overall size of the data packet 102 being transmitted to the destination network node through any intermediate hops.

Figure 2:
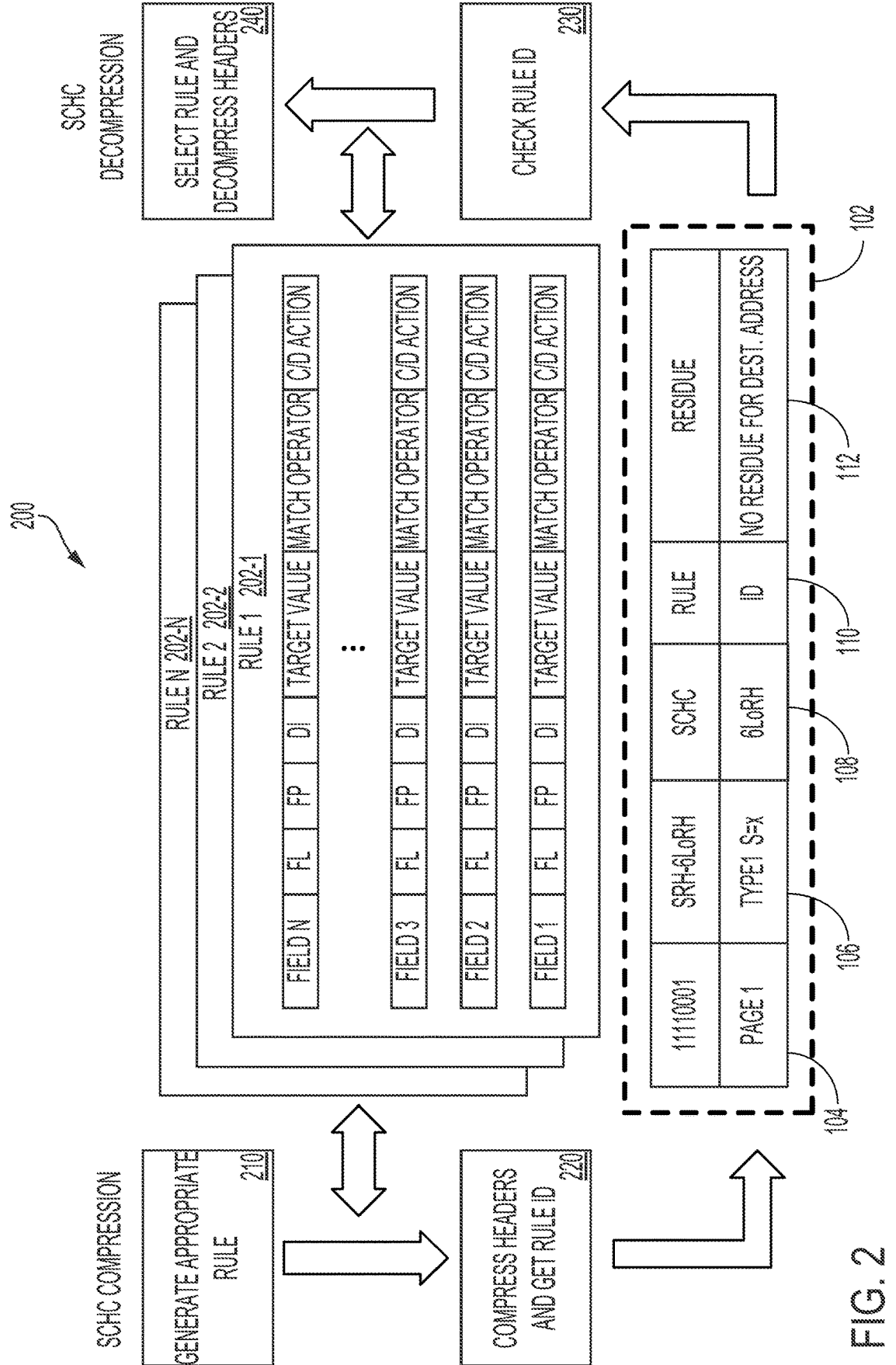
FIG. 2 shows an illustrative example of an environment in which a data packet is encoded with a rule identifier based on information included in the SRH-6LoRH in the data packet in accordance with at least one embodiment.

FIG. 2 shows an illustrative example of an environment 200 in which a data packet 102 is encoded with a rule identifier based on information included in the SRH-6LoRH in the data packet in accordance with at least one embodiment. The data packet 102 may be similar to the data packet described above in connection with FIG. 1. For instance, the data packet 102 may include the aforementioned dispatch value 104, SRH-6LoRH header 106, SCHC dispatch field 108, and SCHC header, which may include the rule identifier field 110 and the compression residue 112.

In the environment 200, a SCHC compressor may, at step 210, generate an appropriate rule that may be used for compression/decompression or for fragmentation/reassembly of SCHC information within a data packet. The rule may be assigned a corresponding rule identifier, which may be included in the rule identifier field 110 of the data packet 102, as described above. This rule identifier may be transmitted through the data packet 102 as opposed to known field values. The new rule may match original packet values that may be known by both the root node and the destination node. Thus, based on the provided rule identifier, the destination node may use the rule identifier to obtain the corresponding rule and determine how to decompress the SCHC information encoded in the data packet 102.

A rule (such as rules 202-1-202-N, illustrated in FIG. 2) may include a list of field descriptors comprising a field identifier, a field length, a field position, a direction indicator, a target value, a matching operator, and a compression/decompression action. The field identifier may designate a protocol and field among all protocols that a SCHC compressor processes. If protocol nesting is present, the field identifier may further identify this nesting. The field position may indicate which occurrence the field descriptor applies to in the event that some fields occur multiple times in a packet header. The default value for the field descriptor may be "1" and may denote the first occurrence. The direction indicator may indicate the packet direction the field descriptor applies to (e.g., uplink, downlink, either uplink or downlink). The target value may be used to match against the packet header field. The target value can be a scalar value or a complex structure. The matching operator may be used to match the field value and the target value. The compression/decompression action may describe the pair of actions that are performed at the compressor to compress a header field and at the decompressor to recover the original value of the header field. A further description of these field descriptors and rules in the SCHC context is provided in IEEE Request for Comments (RFC) 8724, which is incorporated in its entirety into the present disclosure by reference.

In an embodiment, the SCHC compressor dynamically instantiates a rule based on information found in the 6LoRH of the data packet 102, which may already compress network addresses in the network address header. Thus, the new rule instantiated by the SCHC compressor may indicate that the SCHC-compressed network address may be found in the 6LoRH of the data packet 102 as opposed to the compression residue 112. At step 220, the SCHC compressor may compress the different headers of the data packet 102 and obtain the rule identifier for the newly generated rule. For instance, the SCHC compressor may encode the dispatch value 104 to indicate the binary value corresponding to the Page 1 paging dispatch for 6LoWPAN compression and the use of the 6LoRH for carrying network address routing information. The SCHC compressor may further encode the SRH-6LoRH header 106 with the set of compressed network addresses corresponding to the different network nodes or hops according to the network route the data packet 102 is to traverse to reach a destination node. The SCHC compressor may further encode the SCHC dispatch field 108, which may serve to indicate that the next fields in the data packet 102 include a SCHC header that comprises the rule identifier corresponding to the newly generated rule and a compression residue. As noted above, the SCHC dispatch field 108 may be encoded to indicate that the data packet 102 is using the 6LoRH for the SCHC-compressed address in the SRH-6LoRH header 106.

As noted above, as the data packet 102 transits along the network route defined through the ordering of network addresses within the first field of the data packet 102, the intermediate network nodes or hops may consume these network addresses until the only network address remaining is that of the destination node (e.g., the final recipient of the data packet 102 along the network route). The destination node, through a SCHC decompressor, may receive the data packet 102 and, at step 230, check the rule identifier specified in the rule identifier field 110 of the data packet 102.

Based on the rule identifier specified in the rule identifier field 110, the SCHC decompressor, at step 240, may obtain the corresponding rule and begin decompression of the SCHC information encoded in the data packet 102. As noted above, the rule may indicate that the SCHC-compressed network address is encoded within the 6LoRH as opposed to the compression residue 112 of the data packet 102. Accordingly, the SCHC decompressor may evaluate the SRH-6LoRH header 106 of the data packet 102 to obtain the destination network address and use this destination network address to decompress the SCHC information encoded in the data packet 102. Since the SCHC information is decompressed using the destination network address indicated in the SRH-6LoRH header 106, the compression residue 112 within the data packet 102 does not need to be used for decompression of the SCHC information.

It should be noted that while IPv6 network addresses and corresponding fields are used throughout the present disclosure for the purpose of illustration, other types of network addresses and corresponding fields may be used for the data packet 102 and for decompression of the SCHC information encoded in the data packet 102. For instance, if the data packet 102 includes a Media Access Control (MAC) header, the SCHC-compressed address may be encoded in the interface identifier (IID) within the MAC header. For data packets including this MAC header, the data packets may encode and compress the MAC addresses corresponding to the different network nodes along the network route.

Figure 3:
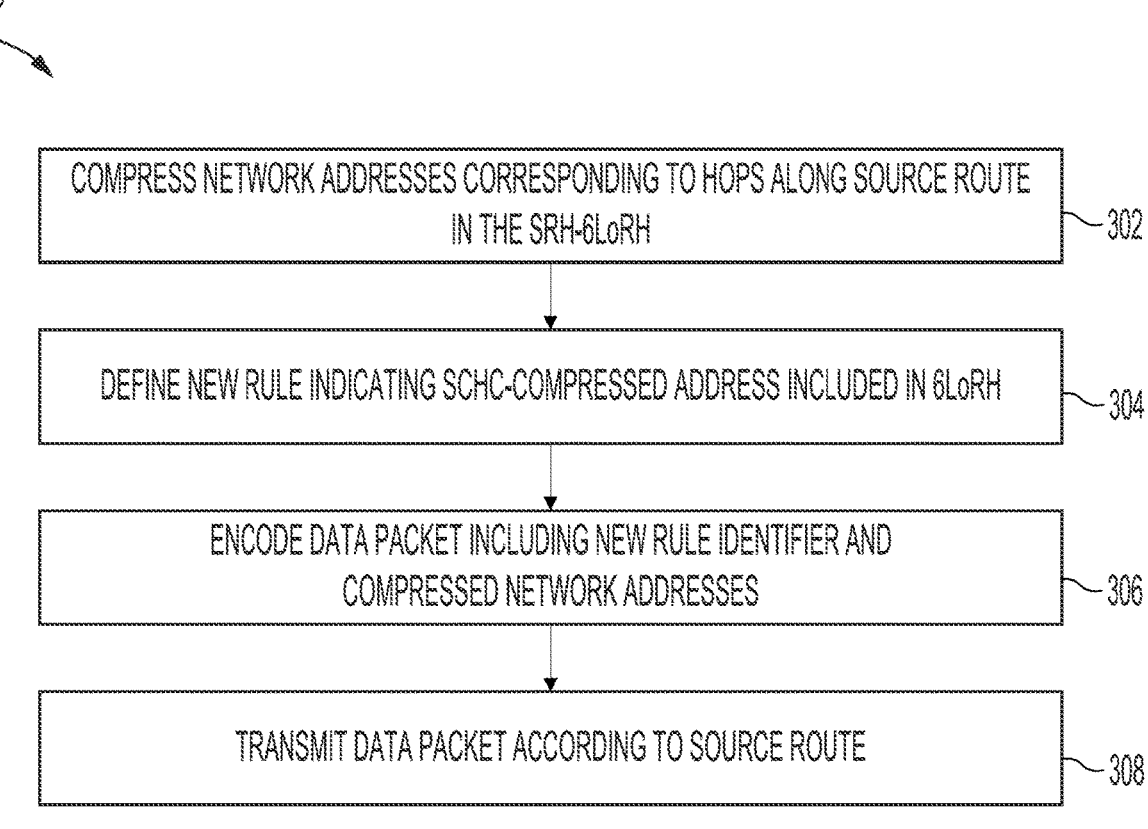
FIG. 3 shows an illustrative example of a process for generating a data packet that encodes a set of IP addresses within the SRH-6LoRH or MAC header and a rule identifier corresponding a new rule indicating a SCHC-compressed address that is included in the 6LoRH or IID in accordance with at least one embodiment.

FIG. 3 shows an illustrative example of a process 300 for generating a data packet that encodes a set of IP addresses within the SRH-6LoRH and a rule identifier corresponding a new rule indicating a SCHC-compressed address that is included in the 6LoRH in accordance with at least one embodiment. The process 300 may be performed by a SCHC compressor, which may generate data packets that encode network addresses corresponding to the different network nodes or hops along a network route, rule identifiers corresponding any applicable rules for decompressing the SCHC information encoded in the data packets, and compression residues. As noted above, while IPv6 addresses are uses extensively throughout the present disclosure, the SCHC compressor may generate data packets that include a MAC header that encodes the different MAC addresses corresponding to the different network nodes or hops along a network route.

At step 302, the SCHC compressor may compress the network addresses (e.g., IPv6 addresses, MAC addresses, etc.) corresponding to the network nodes or hops along a network route within the SRH-6LoRH header or MAC header (depending on the type of network address) of the data packet. As noted above, the SRH-6LoRH header of the data packet may be a Type 1 SRH-6LoRH header, where IPv6 network addresses are compressed according to the IEEE 802.15.4 short address format and where the corresponding network nodes each share a PAN identifier. If the network addresses of the different network nodes or hops are MAC addresses, the SCHC compressor may compress the network addresses within the IID of the MAC header.

At step 304, the SCHC compressor may define a new rule indicating that the SCHC-compressed network address is included in the 6LoRH or the IID of the MAC header (depending on the type of network address) of the data packet. The new rule may indicate that the destination network address is the first address within the SRH-6LoRH or IID of the MAC header within the data packet. As noted above, the network addresses within the SRH-6LoRH or IID may be listed in order according to the network route defined for the data packet, with the first network address listed corresponding to the destination network node for the data packet. As the data packet passes through the different intermediate network nodes or hops along the network route, each intermediate node may consume or otherwise snip its corresponding network address from the SRH-6LoRH or IID of the data packet. Thus, when the data packet is received at the destination network node, the remaining network address indicated in the SRH-6LoRH or IID may correspond to the destination network node.

At step 306, the SCHC compressor may encode the data packet with a rule identifier corresponding to the newly generated rule and with the set of compressed network addresses. For instance, referring to FIG. 1, the SCHC compressor may encode the rule identifier corresponding to this new rule into the rule identifier field 110 of the data packet. As noted above, the rule identifier field may be a part of the SCHC header, which includes both the rule identifier field and the compression residue. The SCHC compressor may encode the SCHC dispatch field 108 of the data packet, which may serve to indicate that the next fields in the data packet include a SCHC header that comprises the rule identifier corresponding to the newly generated rule and a compression residue. The SCHC dispatch field 108 may be encoded to indicate that the data packet is using the 6LoRH for the SCHC-compressed address in the SRH-6LoRH header.

The SCHC compressor may further encode the data packet to include a dispatch value corresponding to the Page 1 paging dispatch for 6LoWPAN compression and the use of the 6LoRH for carrying network address routing information. The SCHC compressor may further encode the SRH-6LoRH header with the set of compressed network addresses corresponding to the different network nodes or hops according to the network route the data packet is to traverse to reach a destination node.

At step 308, the SCHC compressor, through the root node associated with the network route, may transmit the data packet to the destination network node along the defined network route. For instance, the root node may evaluate the SRH-6LoRH header of the data packet to identify the next hop for the data packet. Prior to transmitting the data packet to the identified next hop, the root node may consume or snip its network address from the SRH-6LoRH header. Each intermediate network node or hop may perform similar operations, consuming or snipping their corresponding network addresses from the SRH-6LoRH header until the data packet is received at the destination network node. The destination network node may correspond to the last entry in the SRH-6LoRH header.

Figure 4:
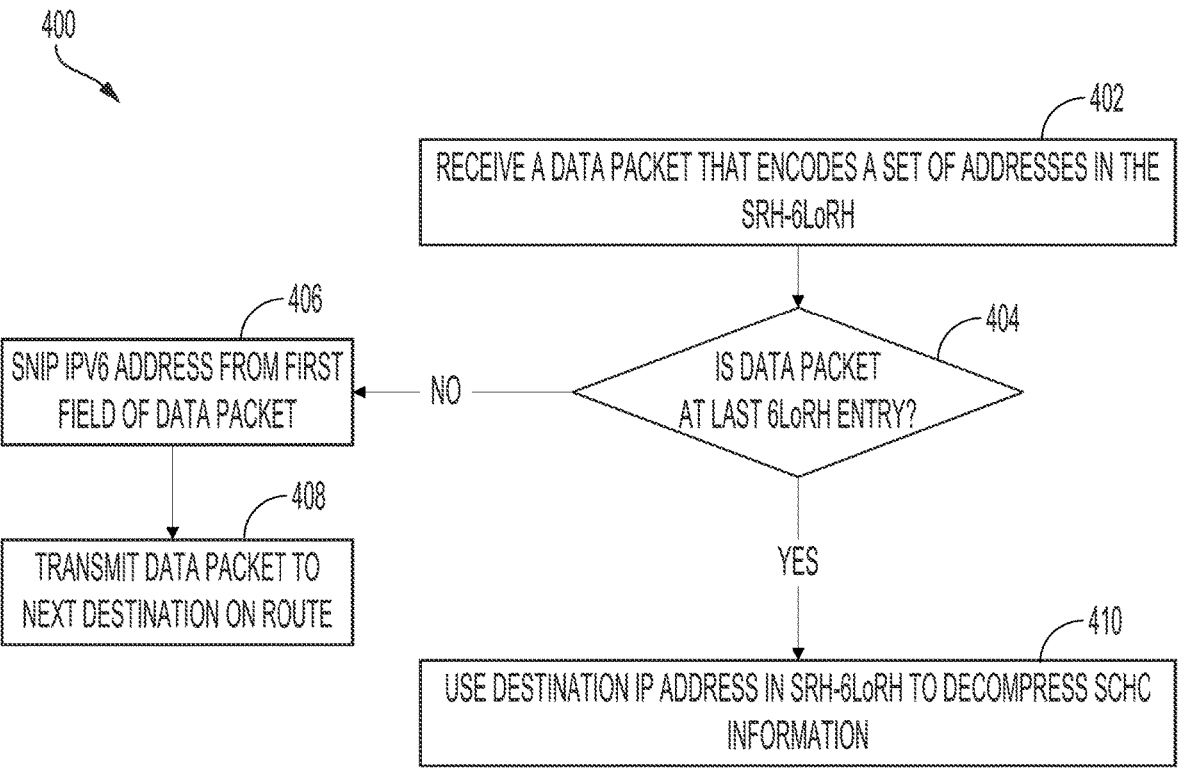
FIG. 4 shows an illustrative example of a process for using a network address indicated in the last 6LoRH or IID entry in the data packet to decompress SCHC information encoded in the data packet in accordance with at least one embodiment.

FIG. 4 shows an illustrative example of a process 400 for using a network address indicated in the last 6LoRH or IID entry in the data packet to decompress SCHC information encoded in the data packet in accordance with at least one embodiment. The process 400 may be performed by any network node or hop along a network route, including a destination node that may be associated with a SCHC decompressor. The SCHC decompressor may decompress the SCHC information encoded in any received data packets according to any applicable rules indicated through a rule identifier field in these data packets. As noted above, the rules corresponding to the rule identifiers specified in these data packets may indicate that the SCHC-compressed network address is to be found in the 6LoRH or the IID of the MAC header in these data packets as opposed to the compression residue.

At step 402, a network node along a network route may receive a data packet that encodes a set of network addresses in the SRH-6LoRH header or MAC header of the data packet. As noted above, the SRH-6LoRH header or MAC header includes a set of compressed network addresses (e.g., IPv6 addresses or MAC addresses for SRH-6LoRH or MAC headers, respectively) corresponding to the different network nodes or hops according to the network route the data packet is to traverse to reach a destination node. If the network addresses are compressed in a SRH-6LoRH header, the SRH-6LoRH may be implemented as a Type 1 SRH-6LoRH header, whereby the network addresses that are compressed into the data packet are derived from an IEEE 802.15.4 short address and for which the corresponding network nodes share a PAN identifier. A SRH-6LoRH header may further indicate the number of different network nodes or hops that the data packet is to traverse, including the root and destination nodes, as described above. Alternatively, if the network addresses are MAC addresses corresponding to the different network nodes or hops along the network route, the compressed network addresses may be encoded in the IID of the MAC header within the data packet.

At step 404, the network node along the network route may determine whether the data packet has been received at the network corresponding to the last 6LoRH or IID entry in the data packet. As noted above, the network addresses in the SRH-6LoRH or MAC header may be provided in order such that the first address in the SRH-6LoRH or MAC header corresponds to the destination node (e.g., the destination network address) with each subsequent address corresponding to the preceding network node or hop that is to be transited in order to reach the destination network node. As the data packet is transited through these intermediate network nodes, each corresponding network address in the SRH-6LoRH or MAC header is consumed and removed from the data packet. Accordingly, when the data packet arrives at the last SRH-6LoRH or MAC header entry (e.g., the destination network address), the only network address remaining in the SRH-6LoRH or MAC header is the destination network address of the destination network node.

If the 6LoRH or IID within the data packet includes more than one compressed network address, this may serve as an indication that the data packet has not been received by the destination node. Accordingly, the network node, at step 406, may snip the IPv6 or MAC address corresponding to the network node from the first field of the data packet. This may ensure that the remaining network addresses in the 6LoRH or IID within the data packet correspond to the next network nodes or hops along the network route, including the destination node. Once the network node has snipped its network address from the 6LoRH or IID, the network node, at step 408, may transmit the data packet to the next network node or hop along the network route, as indicated through the 6LoRH or IID.

If the 6LoRH or IID within the data packet includes a single compressed network address, the network node may determine that it is the destination node for the data packet. Accordingly, the network node, through the SCHC decompressor, may evaluate the rule identifier field of the data packet to obtain the rule identifier specified in data packet. Based on the rule identifier indicated in the data packet, the SCHC decompressor may obtain the corresponding rule and, at step 410, begin decompression of the SCHC information encoded in the data packet. As noted above, the rule may indicate that the SCHC-compressed network address is encoded within the 6LoRH or IID of the MAC header as opposed to the compression residue of the data packet. Accordingly, the SCHC decompressor may evaluate the SRH-6LoRH header or MAC header of the data packet to obtain the destination network address and use this destination network address to decompress the SCHC information encoded in the data packet. Since the SCHC information is decompressed using the destination network address indicated in the SRH-6LoRH header or MAC header, the compression residue within the data packet does not need to be used for decompression of the SCHC information.

FIG. 5 illustrates an example network device 500 suitable for performing switching, routing, and other networking operations in accordance with some implementations. Network device 500 includes a CPU 504, interfaces 502, and a connection 510 (e.g., a Peripheral Component Interconnect (PCI) bus). When acting under the control of appropriate software or firmware, the CPU 504 is responsible for executing packet management, error detection, and/or routing functions. The CPU 504 can accomplish these functions under the control of software including an operating system and any appropriate applications software. The CPU 504 may include one or more processors 508, such as a processor from the Intel® X98 family of microprocessors. In some cases, the processor 508 can be specially designed hardware for controlling the operations of network device 500. In some cases, a memory 506 (e.g., non-volatile RAM, ROM, etc.) also forms part of the CPU 504. However, there are many different ways in which memory could be coupled to the system.

The interfaces 502 are typically provided as modular interface cards (sometimes referred to as "line cards"). Generally, they control the sending and receiving of data packets over the network and sometimes support other peripherals used with the network device 500. Among the interfaces that may be provided are Ethernet interfaces, frame relay interfaces, cable interfaces, Digital Subscriber Line (DSL) interfaces, token ring interfaces, and the like. In addition, various very high-speed interfaces may be provided such as fast token ring interfaces, wireless interfaces, Ethernet interfaces, Gigabit Ethernet interfaces, Asynchronous Transfer Mode (ATM) interfaces, High-Speed Serial Interface (HSSI) interfaces, Packet Over SONET/SDH (POS) interfaces, Fiber Distributed Data Interface (FDDI) interfaces, WiFi interfaces, 3G/4G/5G cellular interfaces, Controller Area Network (CAN) bus, Long Range (LoRa), and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 504 to efficiently perform routing computations, network diagnostics, security functions, etc.

Although the system shown in FIG. 5 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 500.

Regardless of the network device's configuration, it may employ one or more memories or memory modules (including memory 506) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 506 could also hold various software containers and virtualized execution environments and data.

The network device 500 can also include an application-specific integrated circuit (ASIC) 512, which can be configured to perform routing and/or switching operations. The ASIC 512 can communicate with other components in the network device 500 via the connection 510, to exchange data and signals and coordinate various types of operations by the network device 500, such as routing, switching, and/or data storage operations, for example.

FIG. 6 illustrates a computing system architecture 600 including various components in electrical communication with each other using a connection 606, such as a bus, in accordance with some implementations. Example system architecture 600 includes a processing unit (CPU or processor) 604 and a system connection 606 that couples various system components including the system memory 620, such as ROM 618 and RAM 616, to the processor 604. The system architecture 600 can include a cache 602 of high-speed memory connected directly with, in close proximity to, or integrated as part of the processor 604. The system architecture 600 can copy data from the memory 620 and/or the storage device 608 to the cache 602 for quick access by the processor 604. In this way, the cache can provide a performance boost that avoids processor 604 delays while waiting for data. These and other modules can control or be configured to control the processor 604 to perform various actions.

Other system memory 620 may be available for use as well. The memory 620 can include multiple different types of memory with different performance characteristics. The processor 604 can include any general purpose processor and a hardware or software service, such as service 1 610, service 2 612, and service 3 614 stored in storage device 608, configured to control the processor 604 as well as a special-purpose processor where software instructions are incorporated into the actual processor design. The processor 604 may be a completely self-contained computing system, containing multiple cores or processors, a bus, memory controller, cache, etc. A multi-core processor may be symmetric or asymmetric.

To enable user interaction with the computing system architecture 600, an input device 622 can represent any number of input mechanisms, such as a microphone for speech, a touch-sensitive screen for gesture or graphical input, keyboard, mouse, motion input, speech and so forth. An output device 624 can also be one or more of a number of output mechanisms known to those of skill in the art. In some instances, multimodal systems can enable a user to provide multiple types of input to communicate with the computing system architecture 600. The communications interface 626 can generally govern and manage the user input and system output. There is no restriction on operating on any particular hardware arrangement and therefore the basic features here may easily be substituted for improved hardware or firmware arrangements as they are developed.

Storage device 608 is a non-volatile memory and can be a hard disk or other types of computer readable media which can store data that are accessible by a computer, such as magnetic cassettes, flash memory cards, solid state memory devices, digital versatile disks, cartridges, RAMs 616, ROM 618, and hybrids thereof.

The storage device 608 can include services 610, 612, 614 for controlling the processor 604. Other hardware or software modules are contemplated. The storage device 608 can be connected to the system connection 606. In one aspect, a hardware module that performs a particular function can include the software component stored in a computer-readable medium in connection with the necessary hardware components, such as the processor 604, connection 606, output device 624, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

The invention claimed is:

1. A computer-implemented method comprising:
  generating a data packet, wherein a first field of the data packet is usable to define a set of network addresses corresponding to different nodes along a network route, and wherein the data packet includes a Static Context Header Compression (SCHC) residue;
  encoding a first network address of the set of network addresses within the first field of the data packet, wherein the first network address corresponds to a destination network address, and wherein the destination network address is usable to decompress SCHC information encoded in the data packet;
  generating a rule, wherein the rule indicates that the first network address within the first field is usable to decompress the SCHC information, and wherein an identifier corresponding to the rule into the data packet; and
  transmitting the data packet, wherein when the data packet is received at a destination node along the network route, the destination node processes the rule identifier to decompress the SCHC information using the first network address according to the rule.

2. The computer-implemented method of claim 1, wherein the set of network addresses includes one or more Internet Protocol version 6 (IPv6) addresses corresponding to the different nodes along the network route.

3. The computer-implemented method of claim 1, wherein the first field is a Segment Routing Header-6LoWPAN Routing Header (SRH-6LoRH).

4. The computer-implemented method of claim 1, wherein the rule is generated dynamically during processing of the data packet.

5. The computer-implemented method of claim 1, wherein the set of network addresses includes one or more Media Access Control (MAC) addresses corresponding to the different nodes along the network route.

6. The computer-implemented method of claim 1, wherein the data packet does not include other SCHC residue corresponding to the destination network address.

7. The computer-implemented method of claim 1, wherein the set of network addresses are consumed as the data packet progresses through the different nodes such that, when the data packet is received at the destination node along the network route, the first field of the data packet includes only the first network address of the set of network addresses.

8. A system, comprising:
  one or more processors; and
  memory storing thereon instructions that, as a result of being executed by the one or more processors, cause the system to:
    generate a data packet, wherein a first field of the data packet is usable to define a set of network addresses corresponding to different nodes along a network route, and wherein the data packet includes a Static Context Header Compression (SCHC) residue;
    encode a first network address of the set of network addresses within the first field of the data packet, wherein the first network address corresponds to a destination network address, and wherein the destination network address is usable to decompress SCHC information encoded in the data packet;
    generate a rule, wherein the rule indicates that the first network address within the first field is usable to decompress the SCHC information, and wherein an identifier corresponding to the rule into the data packet; and
    transmit the data packet, wherein when the data packet is received at a destination node along the network route, the destination node processes the rule identifier to decompress the SCHC information using the first network address according to the rule.

9. The system of claim 8, wherein the set of network addresses includes one or more Internet Protocol version 6 (IPv6) addresses corresponding to the different nodes along the network route.

10. The system of claim 8, wherein the first field is a Segment Routing Header-6LoWPAN Routing Header (SRH-6LoRH).

11. The system of claim 8, wherein the rule is generated dynamically during processing of the data packet.

12. The system of claim 8, wherein the set of network addresses includes one or more Media Access Control (MAC) addresses corresponding to the different nodes along the network route.

13. The system of claim 8, wherein the data packet does not include other SCHC residue corresponding to the destination network address.

14. The system of claim 8, wherein the set of network addresses are consumed as the data packet progresses through the different nodes such that, when the data packet is received at the destination node along the network route, the first field of the data packet includes only the first network address of the set of network addresses.

15. A non-transitory, computer-readable storage medium storing thereon executable instructions that, as a result of being executed by one or more processors of a computer system, cause the computer system to:

generate a data packet, wherein a first field of the data packet is usable to define a set of network addresses corresponding to different nodes along a network route, and wherein the data packet includes a Static Context Header Compression (SCHC) residue;

encode a first network address of the set of network addresses within the first field of the data packet, wherein the first network address corresponds to a destination network address, and wherein the destination network address is usable to decompress SCHC information encoded in the data packet;

generate a rule, wherein the rule indicates that the first network address within the first field is usable to decompress the SCHC information, and wherein an identifier corresponding to the rule into the data packet; and transmit the data packet, wherein when the data packet is received at a destination node along the network route, the destination node processes the rule identifier to decompress the SCHC information using the first network address according to the rule.

16. The non-transitory, computer-readable storage medium of claim 15, wherein the set of network addresses includes one or more Internet Protocol version 6 (IPv6) addresses corresponding to the different nodes along the network route.

17. The non-transitory, computer-readable storage medium of claim 15, wherein the first field is a Segment Routing Header-6LoWPAN Routing Header (SRH-6LoRH).

18. The non-transitory, computer-readable storage medium of claim 15, wherein the rule is generated dynamically during processing of the data packet.

19. The non-transitory, computer-readable storage medium of claim 15, wherein the set of network addresses includes one or more Media Access Control (MAC) addresses corresponding to the different nodes along the network route.

20. The non-transitory, computer-readable storage medium of claim 15, wherein the data packet does not include other SCHC residue corresponding to the destination network address.

* * * * *